United States Patent [19]

Wigley

[11] Patent Number: 4,657,711
[45] Date of Patent: Apr. 14, 1987

[54] GAS/LIQUID CONTACT DEVICE

[76] Inventor: Albert F. Wigley, Stafford Road, Croydon, CR9 4DT, United Kingdom

[21] Appl. No.: 651,280

[22] Filed: Sep. 17, 1984

[30] Foreign Application Priority Data

Oct. 15, 1983 [GB] United Kingdom ............... 8327664
Feb. 29, 1984 [GB] United Kingdom ............... 8405224

[51] Int. Cl.$^4$ ............................................. B01F 3/04
[52] U.S. Cl. ................................... 261/79.2; 261/112
[58] Field of Search .............................. 261/112, 79 A

[56] References Cited

U.S. PATENT DOCUMENTS

| | | | |
|---|---|---|---|
| 1,847,216 | 3/1932 | Hubbard | 261/112 |
| 2,917,292 | 12/1959 | Hittrich | 261/112 |
| 3,733,063 | 5/1973 | Loetel et al. | 261/112 |
| 3,775,234 | 11/1973 | Rich | 261/112 |
| 3,952,077 | 4/1976 | Wigley | 261/112 |
| 3,963,810 | 6/1976 | Holmberg et al. | 261/112 |
| 4,186,159 | 1/1980 | Huber | 261/112 |

FOREIGN PATENT DOCUMENTS

| | | | |
|---|---|---|---|
| 2060178 | 11/1971 | Fed. Rep. of Germany | 261/112 |
| 2262838 | 7/1973 | Fed. Rep. of Germany | 261/112 |
| 2810094 | 10/1978 | Fed. Rep. of Germany | 261/112 |
| 973746 | 10/1964 | United Kingdom | 261/112 |
| 1351605 | 5/1974 | United Kingdom | 261/112 |

Primary Examiner—Tim Miles
Attorney, Agent, or Firm—Murray and Whisenhunt

[57] ABSTRACT

A packing sheet for use in a device, e.g. a cooling tower wherein a film of liquid and a gas stream are brought into contact to effect heat exchange therebetween, the sheet being continuously corrugated to define a plurality of parallel depressions which are generally V-shaped in cross-section. Preferably the pair of walls which define each depression are disposed substantially at right angles with respect to one another and are disposed at an angle of around 45° with respect to the plane of the sheet. Preferably the sheet is formed with transverse ribs which project from the walls of the depressions and which extend substantially continuously between the depressions to form channels which communicate between the depressions. Advantageously the sheet is formed in the walls of the depressions with angled projections, which preferably extend continuously between two adjacent crests of the depressions.

From another aspect the invention is a cooling tower pack for use in effecting contact between gas and a flowing liquid film, the pack comprising a plurality a packing sheets as described above assembled together to define a plurality of interconnected tubular cells each of which is of substantially rectangular cross-section, the arrangement being such that the adjacent sheets are in line contact with one another at intervals so that substantially the whole surface of the sheets is available for use in effecting the gas/liquid contact.

8 Claims, 7 Drawing Figures

GAS/LIQUID CONTACT DEVICE

DESCRIPTION

The invention relates to a device for use in effecting contact between a gas and a flowing liquid film, more particularly but not exclusively for effecting heat transfer between the gas and liquid, such as in a water cooling tower.

It is known to provide a pack for a cooling tower which pack comprises a plurality of similar sheets of a plastics material formed, e.g. by vacuum forming, with a series of corrugations so that when the sheets are assembled together they define a series of tubular cells through which liquid is intended to pass under gravity while gas is passed upwardly through the cells so that heat is transferred from one to the other. Such an arrangement is described in our U.K. patent specification No. 1351605.

It is an object of the invention to provide a device for use in effecting contact between a gas and a flowing liquid film of the same general kind as described in U.K. 1351605 but which more efficiently utilizes the available area of the sheets of the pack for liquid/gas contact.

Another object of the invention is to provide a device for use in effecting contact between a gas and a flowing liquid film of the same general kind as described in 1351605 and which can be used both in counterflow and in crossflow configurations.

From one aspect the invention provides a packing sheet for use in a device wherein a film of liquid and a gas stream are brought into contact to effect heat exchange therebetween, the sheet being continuously corrugated to define a plurality of parallel depressions which are generally V-shaped in cross-section.

The depressions preferably present a similar appearance on both sides of the sheet. The pair of walls which define each depression may be disposed substantially at right angles with respect to one another and at an angle of around 45° with respect to the plane of the sheet.

The sheet is preferably formed with transverse ribs which project from the walls of the depressions and the transverse ribs may extend substantially continuously between the depressions to form channels which communicate between the depressions. The transverse ribs may be of sinusoidal transverse cross-section so that they present a similar appearance on both sides of the packing sheet.

Preferably the sheet is formed in the walls of the depressions with angled projections which may extend continuously between two adjacent crests of the depressions. Preferably the angled projections may be disposed on the sheet so that each of them has one end adjacent to a middle portion of an adjacent angled projection, and so that adjacent angled projections project from opposite sides of the sheet.

The disposition of the angled projections on the packing sheet may be asymmetric. Angled projections are preferably formed in the walls of the depressions on both sides of the sheet.

From another aspect the invention provides a cooling tower pack for use in effecting contact between gas and a flowing liquid film, the pack comprising a plurality of packing sheets assembled together to define a plurality of interconnected tubular cells each of which is of substantially rectangular cross-section, the arrangement being such that the adjacent sheets are in line contact with one another at intervals so that substantially the whole surface of the sheets is available for use in effecting the gas/liquid contact.

The cooling tower pack preferably comprises sheets as described above, whereby two identical packing sheets can be assembled together by turning one through 180° with respect to the other, whereupon at least some of the angled projections on one sheet lie adjacent to at least some of the angled projections on the other sheet to form in each rectangular section tubular cell means for imparting a rotary motion to gas passing through the cell. The tubular cells are preferably square in cross-section.

An example of gas/liquid contact packing according to the invention will now be described with reference to the accompanying drawings, in which.

Figure 1:
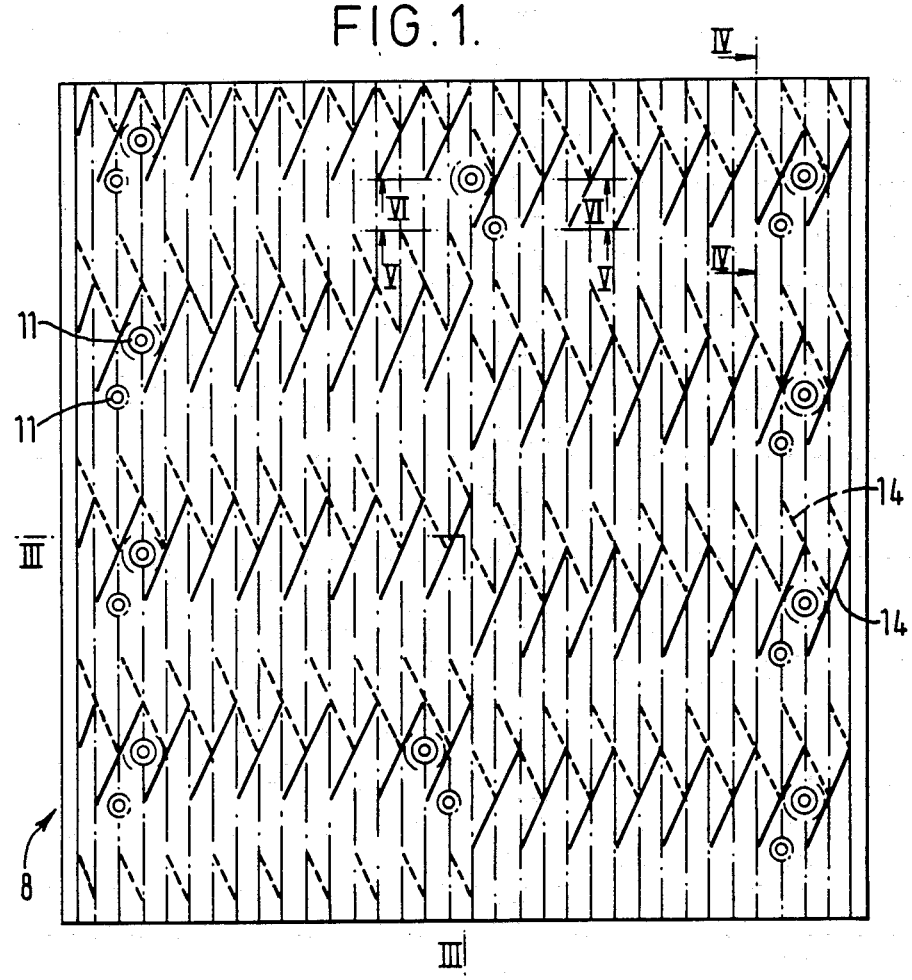
FIG. 1 is a plan view of a packing sheet.

In the drawings there is shown a packing sheet 8 for an evaporative cooling tower, the sheet being vacuum formed from plastics material and being of same general kind as is described in United Kingdom patent specification No. 1351605. In the present case however the packing sheet is intended not only for use in counterflow systems but also in crossflow arrangements. Whereas in a counterflow system the packing sheets are abutted to form a series of tubular cells, when used in a crossflow system the sheets will be spaced apart to leave gaps between fthe sheets in a manner known per se.

Figure 2:
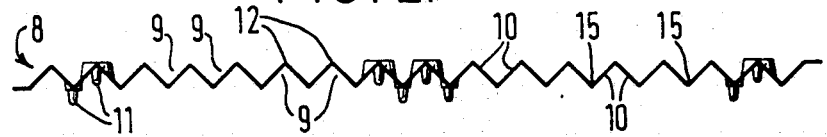
FIG. 2 is an end view of the packing sheet of FIG. 1.

The sheets according to the present invention are continuously corrugated to form a plurality of parallel depressions or corrugations 9 which are V-shaped in cross-section as seen in the end view of FIG. 2, the corrugations or depressions being mutually parallel and of equal size. The two flat walls 10 forming each corrugation or depression 9 are generally at right angles to one another and are such that they present the same appearance on both sides of the sheet.

Figure 3:
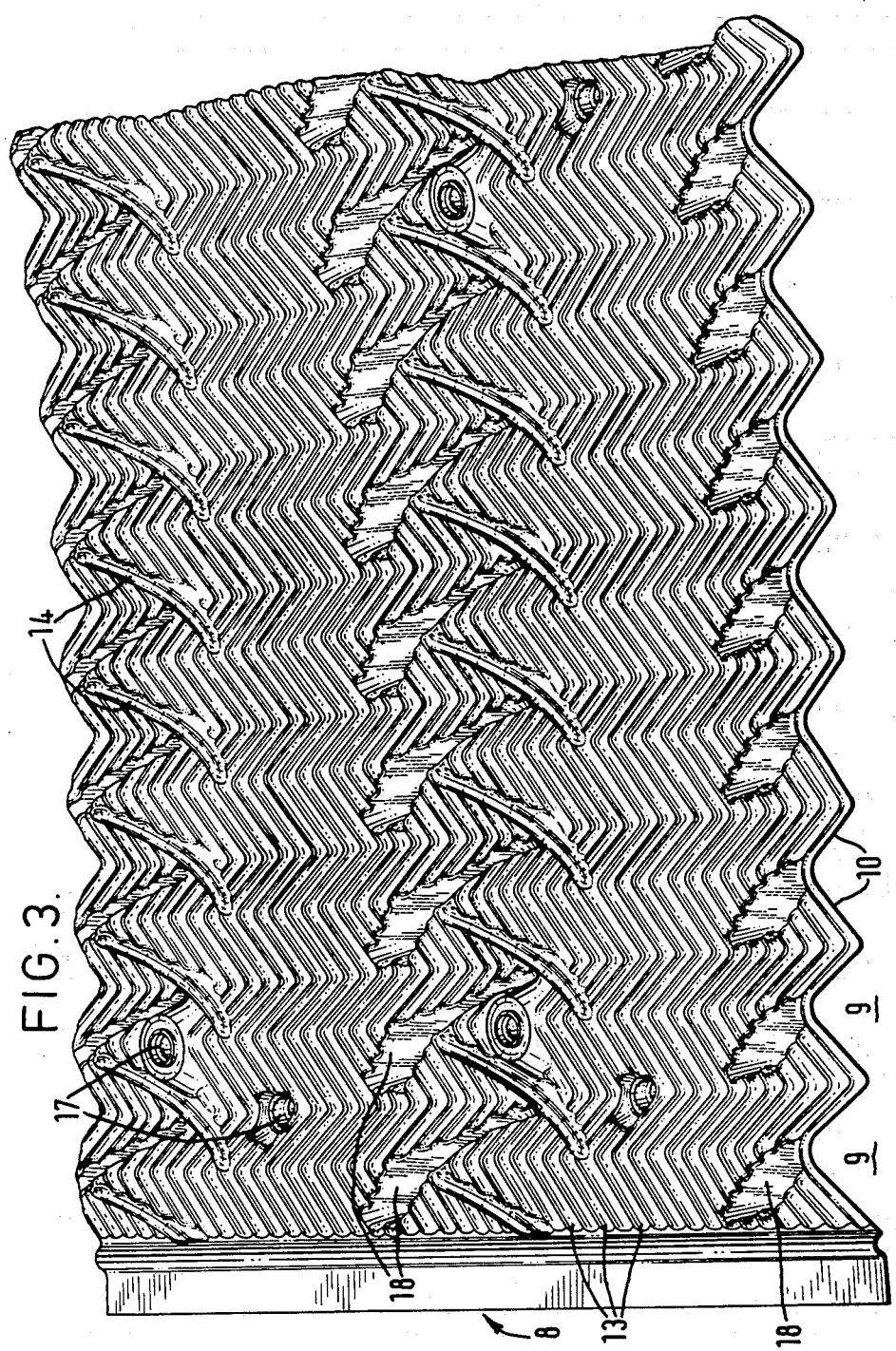
FIG. 3 is a scrap perspective view on an enlarged scale of part of the packing sheet of FIG. 1.
Figure 7:
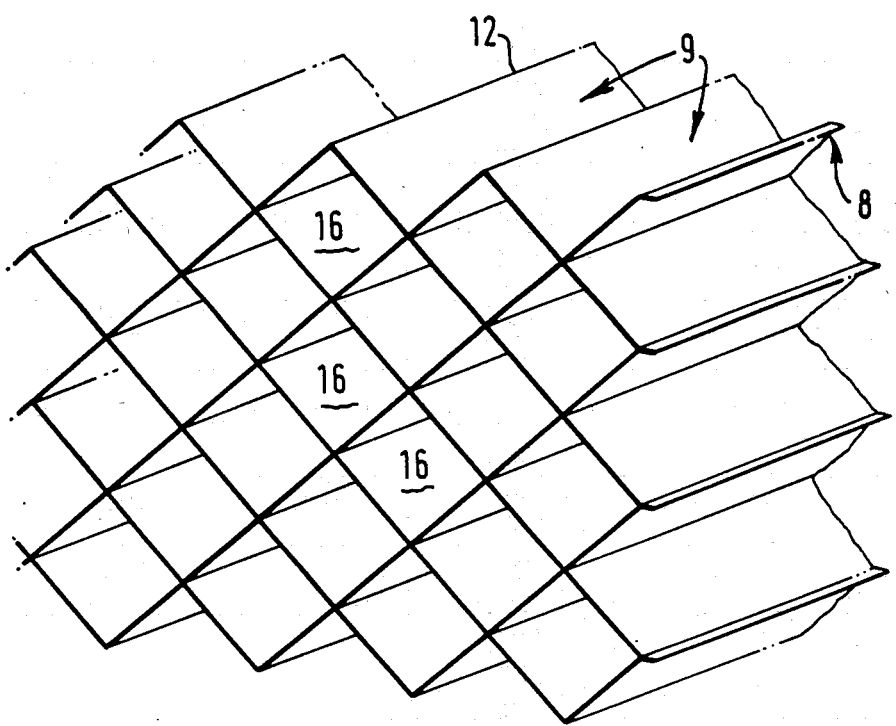
FIG. 7 shows a number of the packing sheets of FIGS. 1 to 6 assembled together to form a cooling tower pack.

The sheet 8 is formed with cylindrical or conical projections 11 extending from the tops and from the bottoms of some of the corrugations 9 and these cylindrical and conical projections 11 form, on the other side of the sheet, correspondingly shaped recesses 17 (see FIG. 3) whereby on assembly of a plurality of the sheets to form a pack the projections can be located in the recesses of adjacent sheets to hold the sheets mutually positioned with the tops or crests 12 of the corrugations of each sheet in contact with the tops of the corrugations of adjacent sheets to form a pack consisting of a series of tubular cells of substantially square cross-section as shown in FIG. 7. Since the sheets meet in substantially line contact, virtually the whole surface of the sheets is available for liquid/gas contact.

Figure 4:
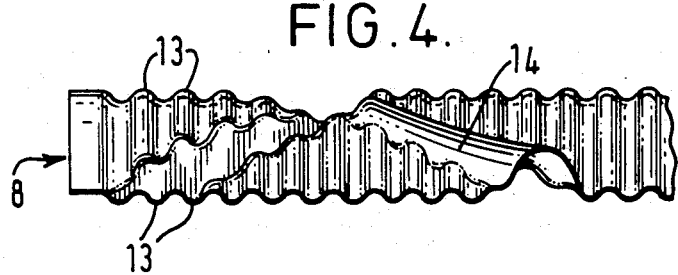
FIG. 4 is a section taken on the line IV—IV of FIG. 1.
Figure 5:
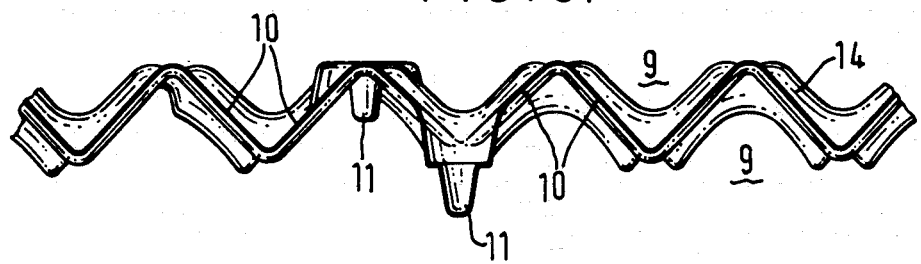
FIG. 5 is a section taken on the line V—V of FIG. 1.
Figure 6:
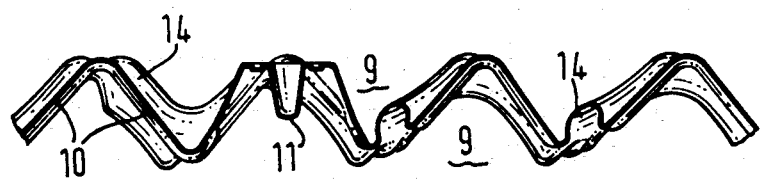
FIG. 6 is a section taken on the line VI—VI of FIG. 1.

To ensure dispersal of the liquid evenly over the surface of the sheets they are formed with relatively small ribs 13 extending at right angles to the corrugations 9. The ribs are substantially sinusoidal in cross-section as best can be seen in FIG. 4 and extend over substantially the whole of the surface of the sheet Additionally the surfaces of the sheets are formed at intervals with elongate or angled projections 14 which extend along the corrugations at an acute angle thereto, e.g. around 30°. Each elongate or angled projection 14 extends from the crests 12 on one side of a depression 9 to the crest 12 on the other side of the same depression. The elongate, angled projections 14 are formed to extend from both sides of the sheet (the projections on one side of the sheet forming corresponding depressions 18 (see FIG. 3) on the other side of the sheet) and are so arranged in relation to one another that each projection has one end adjacent to a middle portion of an adjacent depression, and the middle portion of each projection is disposed adjacent to one end of a depression. These elongate projections are intended to impart a helical motion to gas passing through the tubular cells formed by an assembly of the sheets to improve gas/liquid contact. In FIG. 1 the elongate or angled projections 14 on the upper side of the sheet are indicated in full lines, while those on the underside of the sheet are indicated in dotted lines.

It will be noted from FIG. 4 that the crests 12 and valleys 15 of the sheets forming the tops and the bottoms of the saw-tooth corrugations, are castellated by reason of the presence of the small transverse sinusoidal ribs 13 so that on assembly of the sheets 8 to form a pack the tubular cells 16 of the pack are interconnected by substantially circular channels formed by pairs of the sinusoidal ribs 13 so that liquid overload of any cell 16 is prevented by transmission of the excess liquid to the adjacent cells. The general arrangement of such a pack is illustrated in FIG. 7, although it will be understood that, in that particular embodiment, the corners at which the respective sheets abut are generally rounded as may be readily seen from FIGS. 3 through 6.

The invention thus provides a packing, e.g. for a cooling tower, of high efficiency due to the fact that virtually the whole of the surfaces of the packing sheets are used for liquid/gas contact.

I claim:

1. An improved packing sheet for use in a device wherein a film of liquid and a gas stream are brought into contact to effect heat exchange therebetween, said sheet being continuously corrugated to define a plurality of parallel depressions having walls, said depressions being generally V-shaped in cross-section, said sheet being formed in said walls of said depressions with angled projections which extend continuously between two adjacent crests of said depressions, said angled projections being so disposed on the sheet that each angled projection has one end adjacent to a middle portion of an adjacent angled projection and so that adjacent projections project from opposite sides of the sheet.

2. A packing sheet according to claim 1, wherein said depressions present a similar appearance on both sides of the sheet, and wherein a pair of said walls which define each depression are disposed substantially at right angles with respect to one another and are disposed at an angle of around 45 degrees with respect to the plane of the sheet.

3. A packing sheet according to claim 1, wherein the sheet is formed with transverse ribs which project from said walls of said depressions, said transverse ribs extending substantially continuously between said depressions to form channels which communicate between said depressions.

4. A packing sheet according to claim 3, wherein said transverse ribs are of a sinusoidal transverse cross-section so that they present a similar appearance on both sides of the packing sheet.

5. A packing sheet according to claim 1, wherein said angled projections are assymetrically disposed on the packing sheet.

6. A packing sheet according to claim 1, wherein angled projections are formed in said walls of said depressions on both sides of the sheet.

7. A cooling tower pack for use in effecting contact between gas and a flowing liquid film, said pack comprising a plurality of packing sheets as defined in claim 1 assembled together to define a plurality of interconnected tubular cells each of which is of substantially rectangular cross-section, the arrangement being such that adjacent sheets are in line contact with one another at intervals so that substantially the whole surface of the sheets is available for use in effecting gas/liquid contact.

8. A cooling tower pack as claimed in claim 7, and employing packing sheets as claimed in claim 5, whereby two identical packing sheets can be assembled together by turning one through a 180° with respect to the other, whereupon at least some of the angled projections on one sheet lie adjacent to at least some of the angled projections on the other sheet to form in each rectangular section tubular cell means for imparting a rotary motion to gas passing through the cell.

* * * * *